Patented Apr. 10, 1951

UNITED STATES PATENT OFFICE 2,548,679

PREPARATION OF ALKYLTHIOHYDROXYPROPYL QUATERNARY AMMONIUM HALIDES

John F. Olin, Grosse Ile, Mich., assignor to Sharples Chemicals, Inc., a corporation of Delaware No Drawing. Application July 10, 1948,
Serial No. 38,181

15 Claims. (Cl. 260—567.6)

This invention pertains to a new process for producing compositions of matter which are useful as detergents, emulsifying agents and/or wetting agents, as germicides, as intermediates in chemical syntheses, as catalysts in chemical syntheses and for other purposes.

The chemical structure of these compositions of matter is represented by a chemical formula as follows:

in which R is an alkyl radical of from 1 to 30 carbon atoms; in which N is a quaternary nitrogen atom; in which X is halogen such as chlorine, bromine, iodine, and fluorine; and in which $R_1$, $R_2$ and $R_3$ taken together represent from one to three radicals selected from the group consisting of alkyl radicals of from 1 to 18 carbon atoms, the allyl radical, the benzyl radical, and certain hydrocarbon radicals forming with the quaternary nitrogen atom a heterocyclic ring, by which the three valences indicated between N and $R_1$, $R_2$ and $R_3$ are satisfied.

As is well-known, the term "alkyl" means the radical having the formula $C_nH_{2n+1}$ in which $n$ represents an integer beginning with one and progressing with increments of one. The names of such radicals begin with methyl, ethyl, propyl, butyl, amyl, etc. and progress to and through radicals having a considerable number of carbon atoms such as triacontyl which has 30 carbon atoms. It also is well known that, when the number of carbon atoms in an alkyl radical exceeds 2, isomeric forms having the same number of carbon atoms exist and that the number of isomeric forms becomes larger with increase in carbon content. This makes possible not only primary, secondary and tertiary forms of the radical but also a large variety of branched chain forms in addition to the normal straight chain forms.

Examples of hydrocarbon radicals which form with the quaternary nitrogen atom of the above formula a heterocyclic ring are the hydrocarbon radicals of this character contained in pyridine, isoquinoline, piperidine, etc.

For purposes of combined wetting, detergency and disinfecting activity, those compounds are preferred in which R has from 8 to 24, and particularly from 12 to 20 carbon atoms, and more particularly in which R is a tertiary alkyl radical such as may be derived by the polymerization of lower olefins, for example, propylene, butylene, amylene, etc., to form polymers having the indicated carbon content, among which may be mentioned tertiary dodecyl, tertiary tetradecyl, tertiary hexadecyl, tertiary octadecyl and the like; in which X is chlorine, bromine or iodine and particularly chlorine; and in which each of $R_1$ and $R_2$ is an alkyl radical of less than 5 carbon atoms and particularly methyl, ethyl or propyl and $R_3$ is an alkyl radical of less than 19 carbon atoms and particularly methyl, ethyl or propyl, or is allyl or benzyl. Preferably, the total number of carbon atoms in my new compositions of matter does not exceed 40.

Compounds corresponding to the above preferred compositions are largely liquid in character at ordinary temperatures though some are solids. These compounds lend themselves very suitably to mixing with so-called builders in common use in the field of detergents such as water soluble sulfates, sulfites, thiosulfates, chlorides, dihydrogen phosphates, borates and acetates, examples of which are the sodium, potassium, lithium and ammonium sulfates, sulfites, thiosulfates, chlorides, phosphates, borates and acetates. Alkali metal sulfates such as sodium sulfate are particularly suitable for use as builders, and may be incorporated with my compounds in any desired or suitable quantity such as between 30% and 95% of the total mixture. Thus, by mixing my compound or compounds in liquid form with a suitable quantity of builder, followed by drying to remove any solvent present, such as water and/or alcohol, a free-flowing solid product of excellent appearance and enhanced surface activity may be produced.

My compounds may be prepared by a new but relatively simple process from raw materials which are readily available and of low cost, and in this respect, as well as others, my invention is a distinct advance over the prior art in which germicidal agents containing quaternary nitrogen are largely made from relatively more costly and less readily obtainable raw materials.

Quaternary ammonium compounds having a higher aliphatic radical attached to the quaternary nitrogen atom are characterized in general by their capacity, even in extremely low concentration, to kill bacteria. In contrast with most products of the prior art, however, the higher alkyl substituent present in my higher aliphatic radical of my preferred quaternary salts may be derived readily from a petroleum rather than from an animal or vegetable source with attendant economy of manufacture.

This economy is especially significant if, as is contemplated, the quaternary salts are to be used as detergents and/or wetting agents as well as germicides. In this connection, although my compounds are somewhat superior in respect to surface activity (probably because of the additional solublizing effect of the hydroxyl substituent), to other commercially available quaternaries, the minimum concentration necessary to impart useful surface activity to a solution is usually several times greater than that necessary to disinfect. By the preferred process of the present invention my compounds can nevertheless be produced at a cost comparable to that of common non-germicidal surface active agents, and may be employed to great advantage in washing and simultaneous sterilization of clothing, carpets, food receptacles, surgical instruments and the like.

The following data provide a measure of the surace activity and the germicidal activity of a typical compound of the present invention.

TABLE 1

3-tert-hexadecylthio-2-hydroxyproptriethyl ammonium chloride

| | | $H_2O$ |
|---|---|---|
| Surface Tension (dynes/sq. cm.) | 27.5 | 72 |
| Interfacial Tension (dynes/sq. cm.) [1] | 0.25 | 30 |
| Dispersing Power | 23.2 | 5 |
| Phenol Coefficient (FDA) | 700 | |

[1] Water vs. Nujol.

The foregoing values were obtained in accordance with standard procedures (as applied to 0.2% solutions of the indicated compound in medium hard water in the case of surface activity measurements) with the exception of the dispersing power. The latter value is based upon the capacity to disperse pulverized burnt umber coated with an oil, standardization tests having indicated that values above about 15 are characteristic of excellent dispersing agents.

The data of Table 2 pertain to detergency tests on the compound of Table 1, and illustrate the extent to which the washing capacity is augmented by incorporation of sodium sulfate. Wool strips printed with a standard soil were laundered for 15 minutes in the presence of the hexadecylthiohydroxypropyltriethyl ammonium chloride in admixture with varying proportions of sodium sulfate, and the percentage increase in reflectance of the cloth was measured quantitatively.

TABLE 2

| Per cent concentration of quaternary | .20 | .18 | .16 | .13 | .10 | .07 |
|---|---|---|---|---|---|---|
| Ratio: $Na_2SO_4$/quaternary | 0 | 1:9 | 1:4 | 1:2 | 1:1 | 2:1 |
| Per cent increase in reflectance | 20.5 | 34.2 | 30.3 | 29.0 | 25.5 | 1.3 |

I shall now describe my new procedure for the production of these compounds.

In this procedure I combine a mercaptan with an epihalohydrin in the presence of a catalyst capable of catalyzing the condensation of the epihalohydrin with the mercaptan in a manner to produce a condensation product having a terminal halogen atom on the epihalohydrin substituent. This intermediate condensation product is then reacted with a tertiary amine to produce the final compound.

The condensation reaction is conducted in the presence of the tertiary amine to be quaternized in which case the tertiary amine performs a dual function, acting not only as one of the reactants in providing the quaternary nitrogen atom having the substituents $R_1$, $R_2$ and $R_3$ attached, but also as a catalyst for catalyzing the condensation of the epihalohydrin with the mercaptan.

This reaction may be carried out at any suitable temperature and pressure, temperatures between 50° C. and 150° C. and pressures at or near atmospheric being very suitable.

Conveniently, the reaction is carried out in the presence of a solvent such as a lower aliphatic alcohol, for example, methanol, ethanol, propanol, butanol, pentanol, etc. The temperature of the reaction may be very conveniently controlled by conducting the reaction under reflux conditions, the volatility of the solvent employed being the controlling factor in such instances. I have found that the use of isopropanol as a solvent is highly satisfactory for these purposes.

After the reaction has proceeded to a desired extent such as by continuing the refluxing of the solvent for, say from 4 to 24 hours, the reaction mass is conveniently, though not necessarily, diluted to reduce its viscosity, such as by the addition of solvent, for example, water and/or a low boiling alkanol, for example, isopropanol. The dilution is largely to facilitate further treatment such as by way of purification, which usually is desired in the production of a high quality product, although it is to be understood that the reaction product itself may be employed in those instances where the use of a purified product is non-essential.

Purification is largely by way of removal of small quantities of high boiling oils, which may be accomplished by any suitable means such as by extraction with a solvent.

A suitable purification procedure is to first distill off the solvent employed during the reaction, whereupon water may be added in substantial amount such as in the neighborhood of from 100 to 150% based on the reaction product. The mixture is then conveniently heated (under pressure, if required) to a temperature of from say 40° C. to 150° C. to avoid the formation of a stable emulsion, and the mixture may then be extracted with a suitable solvent such as a hydrocarbon solvent of which hexane and toluene are examples. The high molecular weight by-product oils are selectively dissolved in the solvent, and are thus removed from the desired salt.

In the selection of the reactants, consideration is, of course, given to the desired chemical structure of the product. Thus in the selection of the mercaptan or mercaptans to be used, consideration is given to the desired chemical structure of the radical R in the above formula, it being understood that it is the hydrocarbon radical of the mercaptan which corresponds to the substituent R in the above formula. This mercaptan also furnishes the sulfur atom to which the hydrocarbon radical is attached. Thus the condensation of a mercaptan with an epihalohydrin may be represented by the following equation:

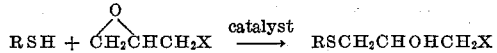

in which X represents halogen.

From the foregoing it can be seen, for example, that if R of the mercaptan is octadecyl, the octadecyl radical remains attached to the sulfur atom and appears as such in the condensation product.

The epihalohydrin may have any desired halogen substituent, and I find epichlorhydrin very suitable for the purpose. In some respects epibromohydrin and epiiodohydrin are equally suitable.

In the selection of the tertiary amine, consideration is given to the desired substitutent or substituents represented by $R_1$, $R_2$ and $R_3$ which add on to the condensation product during the quaternization in the same form in which they exist in the original tertiary amine. Thus if $R_1$ and $R_2$ are methyl and $R_3$ is hexadecyl in the tertiary amine, these substituents will appear as methyl, methyl, and hexadecyl, respectively, in the final compound. Likewise, if $R_1$ and $R_2$ and $R_3$ represent the portion of a cyclic compound attached to the nitrogen atom which is quaternized, such as, in the case of pyridine, isoquinoline, or methyl piperidine, they have the same meaning in the final compound.

Examples of the practice of the foregoing procedure in the production of my new compounds are as follows:

EXAMPLE 1

3-t-dodecylthio-2-hydroxypropyltriethylammonium chloride 106 grams (½ mole) of tech. 95% tertiary dodecyl mercaptan, 53 grams (.53 mole) triethylamine and 47 grams (½ mole) epichlorhydrin were placed in a flask and refluxed at low heat for one-half hour, the temperature rising rather exothermically from 105–117° C. 70 cc. of propyl alcohol was then added and the refluxing operation continued at 105–110° C. for sixteen hours. Examination of a portion of the product by solubility in water revealed that it was quite, but not completely, soluble. 300 cc. of water was added to the product and it was evaporated to dryness on a water bath, employing vacuum. The residue still gave a cloudy solution with water and was therefore taken up in 85% methyl alcohol and extracted with 200 cc. of hexane. Upon evaporating the lower layer to dryness under vacuum the product was obtained as an amber colored, very viscous oil, weighing 122 grams. It was completely water-soluble. Analysis showed it to contain 8.09% sulfur (oxygen bomb) and 8.5% chlorine, by titration. The calculated for $C_{21}H_{46}ONSCl$ to sulfur 8.11% and chlorine 8.98%.

EXAMPLE 2

3-(tert-hexadecylthio)-2-hydroxypropyltriethylammonium chloride 259 grams (1 mole) of tert-hexadecyl mercaptan, 200 grams of isopropanol and 5 cc. of triethylamine were brought to reflux in a suitably equipped glass reaction flask and 92.5 grams (1 mole) of epichlorhydrin was added over a period of 30 minutes. After this mixture had refluxed for an additional two hours to effect substantial conversion to the 3-chloro-2-hydroxypropylthioether, the remainder of 106 grams (1.05 moles) of triethylamine was introduced. After six hours of reaction at 90° C. all but 0.26 equivalent of the amine had reacted, and after 16 hours quaternization was 90% complete.

The product possessed powerful surface and interfacial tension-depressing properties in dilute aqueous solution and was a good detergent, particularly for wool. It had the unusually high phenol coefficient of 700.

EXAMPLE 3

3-(tert-dodecylthio)-2-hydroxypropyltributylammonium chloride

Substantially according to the procedure of Example 1, 202 grams (1 mole) of tert-dodecyl mercaptan was reacted with 92.5 grams (1 mole) of epichlorhydrin and 185 grams (1 mole) of tributylamine. Quaternization was appreciably slower than in the case of triethylamine and required 24 hours to reach 50% conversion. The product is but little soluble in water. It is a potential fungicide.

EXAMPLE 4

3-(tert-octadecylthio)-2-hydroxypropyltrimethylammonium chloride

The apparatus comprised a glass reaction flask equipped with a water-cooled reflux condenser, and a closable charging inlet for the mercaptan and the epichlorhydrin. Trimethylamine was introduced from a separate container through a tube extending below the surface of the reactants, and provision was made for condensing and recycling of unreacted amine.

462 grams (1.5 moles) of tert-octadecyl mercaptan, prepared by sulfhydration of propylene hexamer, and 400 grams of isopropanol were placed in the reaction flask. 132 grams (2.24 moles) of trimethylamine were cooled well below the boiling point and introduced into a glass vessel surmounted by a Dry Ice reflux condenser, said vessel being connected below through a stopcock to the inlet tube of the reaction flask, and connected above to the upper opening of the water-cooled reflux condenser.

By partially opening the stopcock the amine was caused to circulate at a moderate rate through the system while a temperature of about 90° C. was maintained in the reaction flask. The epichlorhydrin was then introduced gradually over a period of 30 minutes. Cycling of the amine through the reaction mixture was continued for seven hours thereafter.

After being freed of dissolved trimethylamine by application of vacuum to the warm mixture, the crude product was diluted with water and was further purified by extraction with toluene. The final water layer thus obtained was evaporated to dryness and the residue was analyzed for sulfur, nitrogen and ionizable chlorine. The N/S ratio was 1.05 and the N/Cl ratio was 1.12, the theoretical in each case being 1 to 1. The product is a strongly germicidal washing agent.

EXAMPLE 5

3-(tert-dodecylthio)-2-hydroxypropylpyridinium chloride

Substantially by the procedure of Example 1, a solution comprising 202 grams (1 mole) of tert-dodecylmercaptan, 79 grams (1 mole) of pyridine, 92.5 grams (1 mole) of epichlorhydrin and 200 grams of anhydrous ethyl alcohol were reacted for 21 hours at reflux temperature. The product was somewhat dark in color. Conversion to quarternary as determined by titration of ionizable chlorine was 82%.

EXAMPLE 6

3-(phenylthio)-2-hydroxypropyltriethylammonium chloride

By the procedure of Example 2, 1 mole of thiophenol was reacted with 1 mole of epichlorhydrin in the presence of a catalytic quantity of triethylamine, and the resulting phenyl-(2-hydroxy-3-chloropropyl)-sulfide was reacted in isopropanol solution with triethylamine. The desired 3-phenylthio-2-hydroxypropyltriethylammonium chloride was obtained in 75% conversion. It is a fungicide.

EXAMPLE 7

3-(tert-butylthio)-2-hydroxypropyldimethyloctadecylammonium chloride 9.9 grams (0.11 mole) t-butyl mercaptan, 10.1 grams (0.11 mole) epichlorohydrin, 50 cc. of anhydrous ethanol and 1 cc. of dimethylaniline were refluxed for four hours; then 29.7 grams (0.1 mole) of dimethyloctadecylamine was added and the mass was refluxed for fourteen hours. After being evaporated to dryness under vacuum on a water bath, the material was taken up in 35 cc. of water. The resulting gel was broken by the addition of 15 cc. of ethyl alcohol. This product gave perfectly clear solutions in water (at 0.1% concentration) which foamed strongly. On a 100% basis the product contained 8.1% ionizable Cl and 3.2% N compared to a theoretical of 7.4% Cl and 2.9% N.

EXAMPLE 8

*3-(benzylthio)-2-hydroxypropyldimethyl-octadecylammonium chloride*

34.7 grams (0.28 mole) benzyl mercaptan, 25.9 grams (0.28 mole) epichlorohydrin and 83.2 grams (0.28 mole) dimethyloctadecylamine were mixed and warmed to approximately 80° where a moderate exothermic reaction was noted. After this had subsided the mixture was heated for two hours at 102° C. at which time samples gave clear solutions in water which foamed strongly. 100 cc. of water was added to the reaction product and it was evaporated to dryness under vacuum on a water bath. The resulting almost colorless syrup was taken up in 25% ethyl alcohol. When reduced to the basis of 100% solids the product contained 6.57% S and 7.16% ionizable Cl compared with calculated values of 6.23% S and 6.88% Cl.

EXAMPLE 9

*3-n-(dodecylthio)-2-hydroxypropyldimethyl-octadecylammonium chloride*

52.5 grams (0.26 mole) n-dodecyl mercaptan, 23.1 grams (0.26 mole) epichlorohydrin, and 74.2 grams (0.25 mole) dimethyloctadecylamine were mixed and 100 cc. of n-propyl alcohol solvent were added. The mixture was then refluxed for twelve hours at approximately 100° C., 100 cc. of water was added and the product evaporated to dryness. The product was taken up in an equal volume of ethyl alcohol. At a concentration of 0.1% in water a slightly turbid solution was formed which foamed slightly. At higher concentrations considerable micelle formation was observed, suggesting that the product may be of much value as an emulsifying and dispersing agent. It is of interest to note that this compound which contains 35 carbon atoms still possesses some solubility in water. It demonstrates the tremendous carrying power of the quaternary nitrogen atom in comparison with other hydrophilic groups, such as the sulfate radical, which will carry about 16 carbon atoms, the sulfonic acid radical, which in the case of sodium cetyl sulfonate will carry 16 carbon atoms, the hydroxyl group, which in propyl alcohol carries but 3 carbon atoms and in amylamine where the amino group carries but 5 carbon atoms.

EXAMPLE 10

*3-(tert-dodecylthio)-2 - hydroxypropyldimethyl-octylammonium chloride*

20.2 grams (0.1 mole) tert-dodecyl mercaptan, 15.7 grams (0.1 mole) dimethyloctylamine, 10.2 grams (0.11 mole) epichlorhydrin and 15 cc. of benzene were refluxed for 24 hours. 150 cc. of water was then added and the solvent stripped in vacuo. The resulting oil was taken up in 50% ethyl alcohol. The product yielded almost clear solutions in water which foamed moderately.

EXAMPLE 11

*3 - (tert - nonylthio) - 2-hydroxypropyldimethyl-benzylammonium chloride*

8 grams (0.05 mole) t-nonyl mercaptan, derived by the addition of hydrogen sulfide to propylene trimer, 5.1 grams (0.055 mole) epichlorhydrin, 7.4 grams (0.055 mole) dimethylbenzylamine and 25 cc. of propyl alcohol were refluxed for eight hours, at the end of which time reaction appeared complete. 50 cc. of water was then added and the mixture evaporated to dryness yielding a clear resinous mass which tended to crystallize upon standing. The product was taken up in diluted alcohol to yield a very water-soluble solution. The ionizable chlorine on a 100% basis was found to be 10.3% compared to a calculated 9.97%.

EXAMPLE 12

*3 -(hydroterpenylthio)-2-hydroxypropyltriethyl-ammonium chloride*

250 parts of turpentine, 250 parts of hydrogen sulfide and 10 parts of boron fluoride were introduced in that order into a 1 gallon steel autoclave, and were reacted for 30 minutes at a temperature between 20° and 40° C. The resulting mixture was thoroughly washed with dilute caustic, and 195 parts of a terpinic mercaptan corresponding to the formula $C_{10}H_{17}SH$, sp. gr. 0.96 and boiling at 112° to 118° C. at 25 mm., was recovered by fractional distillation.

172 parts of this mercaptan, 92.5 parts of epichlorhydrin, 101 parts of triethylamine and 100 parts of ethanol were mixed and were refluxed for eighteen hours. The resulting viscous mixture was freed of alcohol, diluted with 150 parts of water and purified by extraction at 60° C. with naphtha to provide 490 grams of an aqueous solution of the desired product.

The foregoing specific examples have illustrated the preparation of a number of the compounds of my invention by my procedure, i. e. by reaction of substantially equivalent proportions of the mercaptan, the epihalohydrin and the tertiary amine. By the same method, or obvious modifications of it, a wide variety of mercaptans and tertiary amines may be reacted with an epihalohydrin to provide the corresponding quaternary ammonium salt as hereinbefore described. The following table lists some additional products which have been successfully prepared by this process.

TABLE 3

3-(allylthio)-2 - hydroxypropyldimethyloctylammonium bromide 3-(tert-butylthio)-2-hydroxypropylmethylpiperidinum chloride 3-(tert-nonylthio)-2 - hydroxypropyldimethylcyclohexylammonium chloride 3 -(sec - hexylthio) - 2 - hydroxypropyldimethylethylolammonium iodide 3-(tert-octylthio)-2 - hydroxypropylisoquinolinium chloride Suitable catalysts for the condensation of the epihalohydrin with the mercaptan in practice of my invention are, in addition to the tertiary amines employed in the reaction, those organic catalysts for the condensation of mercaptans with epoxides which are neutral or basic in reaction and which contain chemically bound nitrogen. Epoxide condensation catalysts of this character, including, for example, primary amines such as monoalkyl amines having from 1 to 5 carbon atoms in the alkyl radical, for instance, monobutyl amine, secondary amines such as dialkyl amines having from 1 to 5 carbon atoms in each alkyl radical, for instance, dibutyl amine, tertiary amines (which may be either aliphatic, aliphatic-aromatic, or aromatic in character) such as the tertiary amines employed as reactants herein, as well as alkyl-aryl amines and aryl amines such as dimethyl aniline and triphenyl amine, amine oxides such as trialkyl amine oxides having from 1 to 5 carbon atoms in each alkyl radical, for instance, triethyl amine oxide, hexamethylene tetramine, urea, substituted ureas such as the alkyl ureas having from 1 to 5 carbon atoms in each alkyl radical of which there may be from 1 to 4 attached to the nitrogen atoms, for instance, tetraethyl urea, guanidine, substituted guanidines, such as the alkyl guanidines having from 1 to 5 carbon atoms in each alkyl radical of which there may be from 1 to 4 attached to the nitrogen atoms of the amine groups, such as symmetrical dibutyl guanidine, etc., are capable of promoting condensation of the mercaptan with the epihalohydrin to form condensation products which may readily be converted in high yield into my quaternary ammonium salts by reaction with the appropriate tertiary amines. When practicing my invention by use of organic, nitrogen-containing, epoxide-condensation catalysts other than the tertiary amine to be quaternized, I prefer to employ the catalyst in relatively small proportion, say from ½ to 5 per cent by weight based on the mercaptan, in order to minimize the contamination of the ultimate product.

The use of amines as catalysts to effect condensation of a mercaptan with an epihalohydrin, in accordance with the present invention, makes possible the attainment of good yields of the corresponding thioether halohydrins at moderate temperatures and pressures, and avoids both undesirable dehydrohalogenation of the epihalohydrin and decomposition of the more unstable mercaptans.

It will be understood that the foregoing particular description is by way of illustration, and that changes, omissions, additions, substitutions, and/or modifications may be made within the scope of the claims without departing from the spirit of the invention.

I claim:

1. A process comprising mixing under temperature conditions between 50° C. and 150° C. an alkyl mercaptan in which the alkyl radical has from 1 to 30 carbon atoms, an epihalohydrin, and a tertiary amine from the group consisting of trialkyl amines, allyl dialkyl amines, benzyl dialkyl amines, N-alkyl piperidines, pyridine and isoquinoline, wherein the alkyl groups contain from 1 to 18 carbon atoms; and maintaining the foregoing in mutual contact for stoichiometric reaction until the corresponding alkylthiohydroxypropyl quaternary ammonium halide is obtained.

2. The process of claim 1 in which the reaction is carried out in the presence of a solvent which is inert to the reaction.

3. The process of claim 2 in which the solvent is an alkanol containing from 1 to 5 carbon atoms.

4. A process comprising mixing under temperature conditions between 50° C. and 150° C. an alkyl mercaptan in which the alkyl radical has from 8 to 24 carbon atoms, epichlorohydrin, and a tertiary alkyl amine in which two alkyl radicals have less than 5 carbon atoms, and in which the remaining alkyl radical has less than 19 carbon atoms; and maintaining the foregoing in mutual contact for stoichiometric reaction until the corresponding alkylthiohydroxypropyl quaternary ammonium halide is obtained.

5. The process of claim 4 in which the mercaptan is a tertiary alkyl mercaptan.

6. The process of claim 5 in which the tertiary alkyl amine has from 1 to 3 carbon atoms in each alkyl radical.

7. The process of claim 6 in which the tertiary alkyl mercaptan contains from 12 to 20 carbon atoms.

8. The process of claim 7 in which the mercaptan is tertiary octadecyl mercaptan, and in which the amine is triethyl amine.

9. The process of claim 7 in which the mercaptan is tertiary hexadecyl mercaptan, and in which the amine is triethyl amine.

10. A process comprising mixing under temperature conditions between 50° C. and 150° C. an alkyl mercaptan in which the alkyl radical has from 8 to 24 carbon atoms, epichlorohydrin, and a monoallyl dialkyl amine having less than 5 carbon atoms in each alkyl radical; and maintaining the foregoing in mutual contact for stoichiomertic reaction until the corresponding alkylthiohydroxypropyl quaternary ammonium halide is obtained.

11. The process of claim 10 in which the mercaptan is a tertiary alkyl mercaptan.

12. The process of claim 11 in which the tertiary alkyl mercaptan contains from 12 to 20 carbon atoms.

13. A process comprising mixing under temperature conditions between 50° C. and 150° C. an alkyl mercaptain in which the alkyl radical has from 8 to 24 carbon atoms, epichlorohydrin, and a monobenzyl dialkyl amine having less than 5 carbon atoms in each alkyl radical; and maintaining the foregoing in mutual contact for stoichiometric reaction until the corresponding alkylthiohydroxypropyl quaternary ammonium halide is obtained.

14. The process of claim 13 in which the mercaptain is a tertiary alkyl mercaptan.

15. The process of claim 14 in which the tertiary alkyl mercaptan has from 12 to 20 carbon atoms.

JOHN F. OLIN.

REFERENCES CITED

The following references are of record in the file of this patent:

UNITED STATES PATENTS

| Number | Name | Date |
|---|---|---|
| 2,087,132 | Taub et al. | July 13, 1937 |
| 2,108,765 | Domagk | Feb. 15, 1938 |

FOREIGN PATENTS

| Number | Country | Date |
|---|---|---|
| 771,746 | France | July 30, 1934 |
| 782,930 | France | Mar. 25, 1935 |
| 436,793 | Great Britain | Oct. 14, 1935 |
| 806,662 | France | Sept. 28, 1936 |
| 681,850 | Germany | Oct. 3, 1939 |
| 682,393 | Germany | Oct. 13, 1939 |